United States Patent
Fröböse

(10) Patent No.: US 9,086,124 B2
(45) Date of Patent: Jul. 21, 2015

(54) DRIVE FOR A PILGER ROLLER SYSTEM

(75) Inventor: Thomas Fröböse, Versmold (DE)

(73) Assignee: Sandvik Materials Technology Deutschland GMBH, Düsseldorf (DE)

( * ) Notice: Subject to any disclaimer, the term of this patent is extended or adjusted under 35 U.S.C. 154(b) by 516 days.

(21) Appl. No.: 13/511,515

(22) PCT Filed: Nov. 12, 2010

(86) PCT No.: PCT/EP2010/067413
§ 371 (c)(1),
(2), (4) Date: Feb. 1, 2013

(87) PCT Pub. No.: WO2011/064113
PCT Pub. Date: Jun. 3, 2011

(65) Prior Publication Data
US 2013/0186214 A1  Jul. 25, 2013

(30) Foreign Application Priority Data
Nov. 24, 2009  (DE) .................. 10 2009 047 049

(51) Int. Cl.
*B21B 21/00* (2006.01)
*B21B 21/04* (2006.01)
*F16H 21/22* (2006.01)

(52) U.S. Cl.
CPC .............. *F16H 21/22* (2013.01); *B21B 21/005* (2013.01); *B21B 21/045* (2013.01); *Y10T 74/18208* (2015.01)

(58) Field of Classification Search
CPC ..... F16H 21/22; B21B 21/005; B21B 21/045; B21B 21/065
USPC .................................. 72/249, 252
See application file for complete search history.

(56) References Cited

U.S. PATENT DOCUMENTS

| | | |
|---|---|---|
| 67,993 A | 8/1867 | Loomis |
| 259,434 A | 6/1882 | Stockwell |

(Continued)

FOREIGN PATENT DOCUMENTS

| | | |
|---|---|---|
| DE | 853 138 | 7/1949 |
| DE | 1 815 521 | 7/1969 |

(Continued)

OTHER PUBLICATIONS

International Search Report for PCT/EP2010/067413 dated May 6, 2011.

(Continued)

*Primary Examiner* — Teresa M Ekiert
(74) *Attorney, Agent, or Firm* — Morgan, Lewis & Bockius LLP

(57) ABSTRACT

A pilger rolling mill comprising a roll stand, a flywheel on a drive shaft which is mounted rotatably about an axis of rotation, and a thrust rod having a first end and a second end, wherein the first end of the thrust rod is fixed to the flywheel at a radial spacing from the axis of rotation and wherein the second end of the thrust rod is fixed to the roll stand so that in operation of the mill a rotary movement of the flywheel is converted into a translatory movement of the roll stand, comprising a drive motor having a motor shaft, wherein the motor shaft of the drive motor and the drive shaft are connected together in such a way that a rotary movement of the motor shaft leads to a rotary movement of the drive shaft and thus the drive motor drives the flywheel. To provide a pilger rolling mill whose drive for the roll stand exhibits no or only very little wear and which in addition permits a precise displacement of the roll stand with a high degree of repetition accuracy, according to the invention it is proposed that that the drive motor is a torque motor.

15 Claims, 4 Drawing Sheets

(56) References Cited

U.S. PATENT DOCUMENTS

Figure 1:
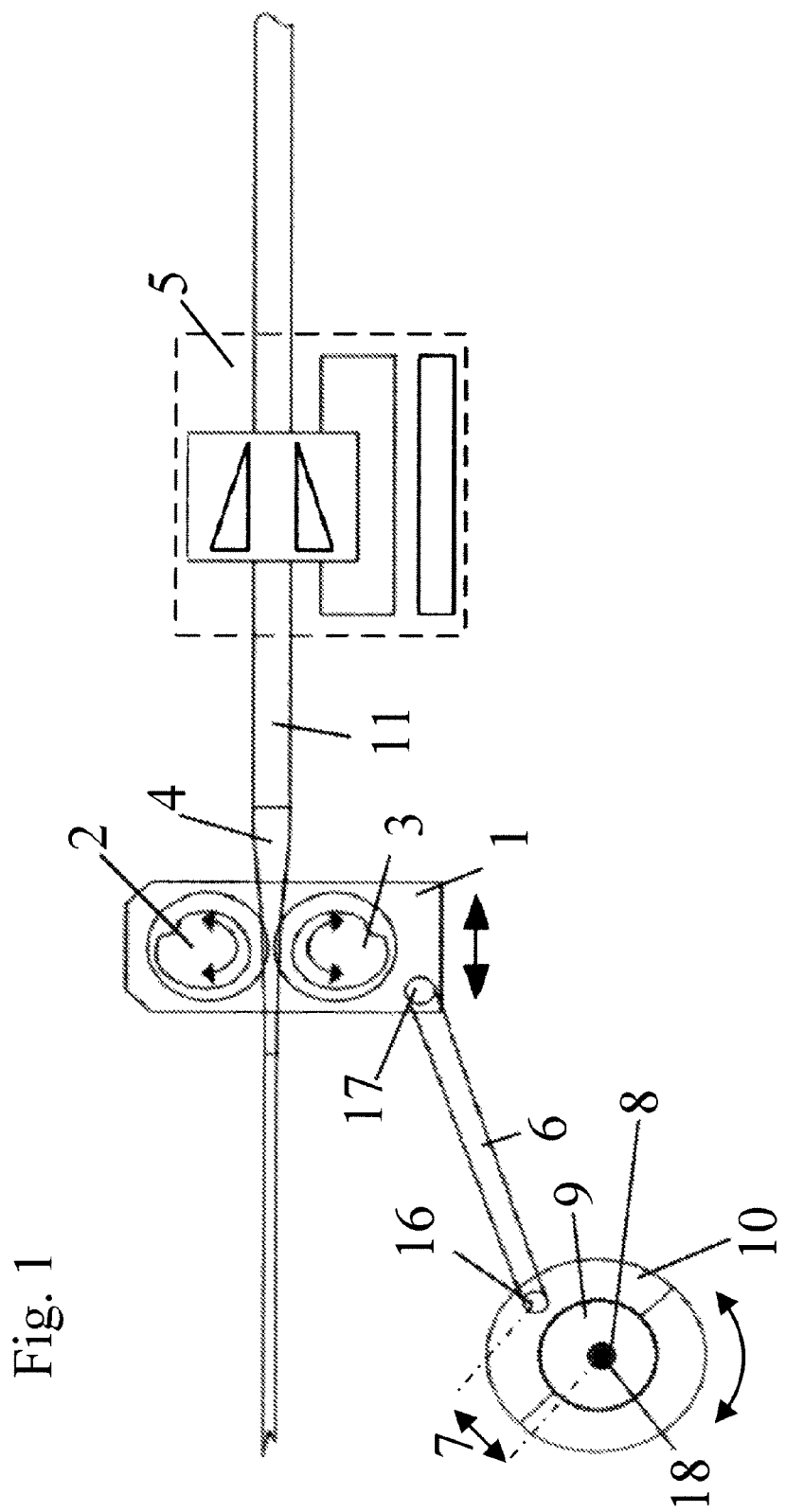

| | | | |
|---|---|---|---|
| 637,772 | A | 11/1899 | Eilers |
| 2,430,761 | A | 11/1947 | Duphily |
| 3,584,489 | A | 6/1971 | Peytavin |
| 3,688,540 | A | 9/1972 | Russel |
| 3,698,225 | A | 10/1972 | Peytavin |
| 3,948,070 | A | 4/1976 | Hentzschel et al. |
| 4,019,394 | A | 4/1977 | Peytavin |
| 4,037,444 | A | 7/1977 | Ledebur et al. |
| 4,090,386 | A | 5/1978 | Naylor et al. |
| 4,154,079 | A | 5/1979 | Peytavin |
| 4,407,438 | A | 10/1983 | Wiechmann |
| 4,577,483 | A | 3/1986 | Rehag et al. |
| 4,641,513 | A | 2/1987 | Peytavin |
| 4,743,216 | A | 5/1988 | Chen et al. |
| 4,930,328 | A | 6/1990 | Duerring |
| 5,351,515 | A | 10/1994 | Astley et al. |
| 5,540,076 | A | 7/1996 | Baensch et al. |
| 6,012,313 | A | 1/2000 | Persico |
| 6,688,152 | B2 | 2/2004 | Klingen et al. |
| 7,992,417 | B2 | 8/2011 | Hayashi |
| 8,191,391 | B2 | 6/2012 | Baensch |
| 2004/0045334 | A1 | 3/2004 | Baensch |
| 2004/0173001 | A1 | 9/2004 | Stinnertz et al. |
| 2010/0192656 | A1 | 8/2010 | Baensch |
| 2012/0125066 | A1 | 5/2012 | Froböse |
| 2012/0139195 | A1 | 6/2012 | Froböse |

FOREIGN PATENT DOCUMENTS

| | | |
|---|---|---|
| DE | 28 00 526 | 7/1978 |
| DE | 36 06 318 | 10/1986 |
| DE | 3823134 | 4/1989 |
| DE | 43 36 422 | 4/1995 |
| DE | 199 11 431 | 9/2000 |
| DE | 101 47 046 | 4/2003 |
| EP | 2 216 107 | 8/2010 |
| EP | 2 216 107 A1 | 8/2010 |
| GB | 1136195 | 4/1967 |
| SU | 770579 | 7/1978 |

OTHER PUBLICATIONS

German Search Report for 10 2009 047 049.2 dated Apr. 15, 2010.
Written Opinion of the International Search Report for PCT/EP2010/067413, dated May 30, 2012 (translation dated Jun. 12, 2012).

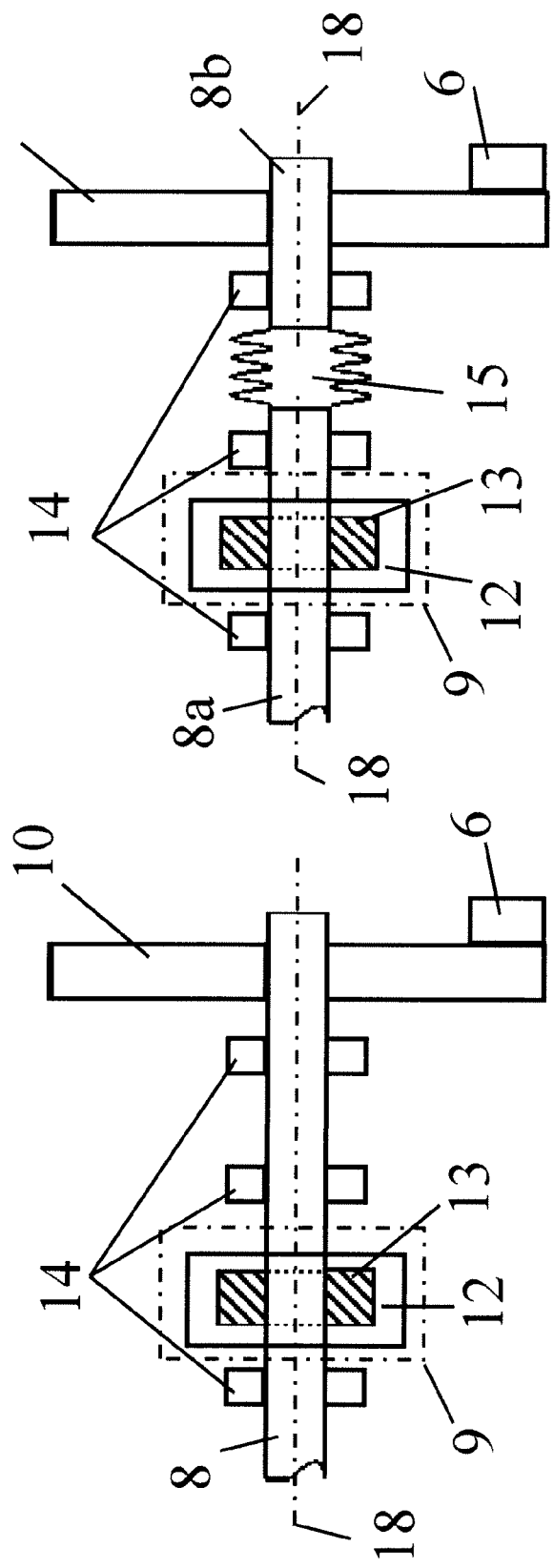

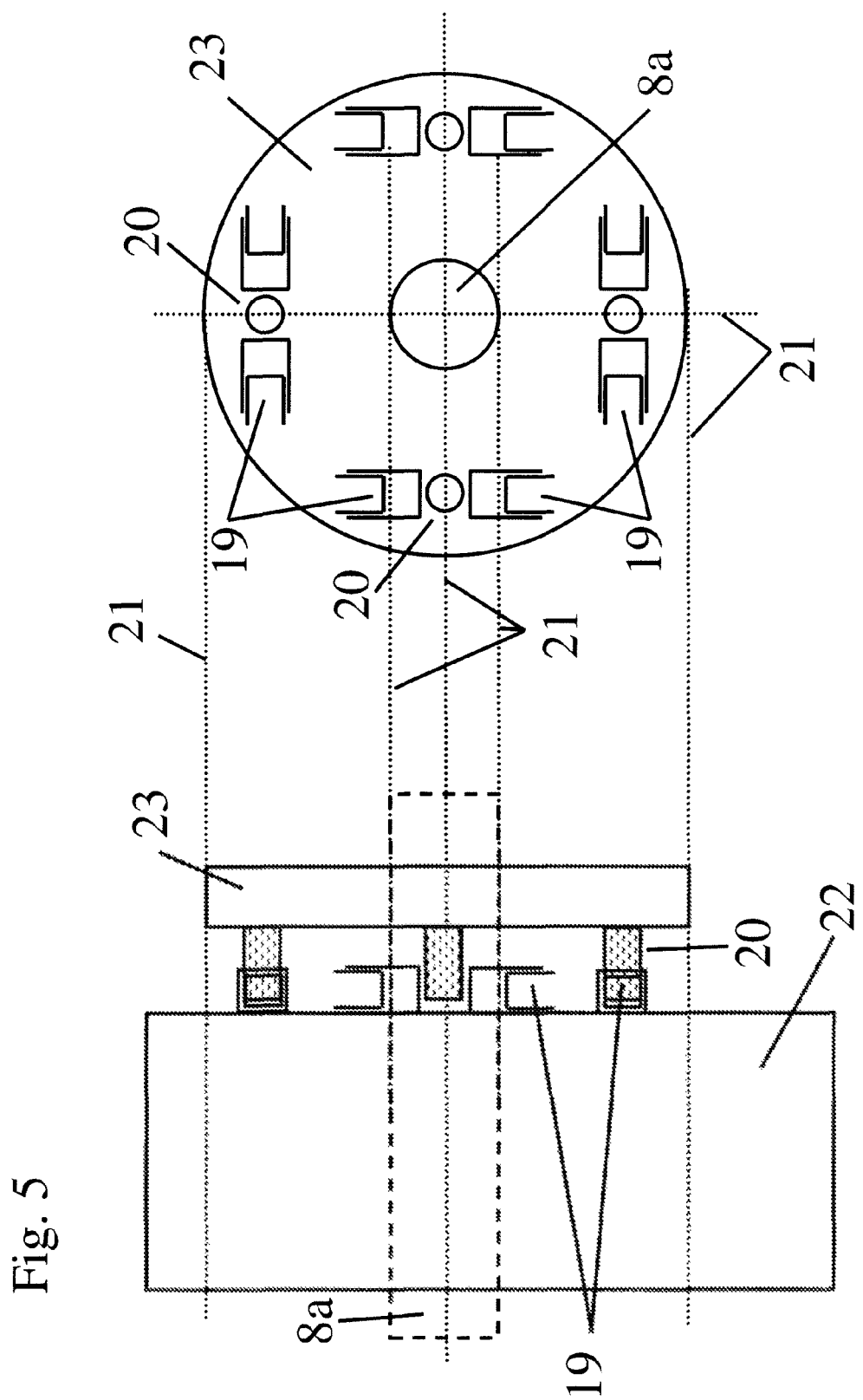

DRIVE FOR A PILGER ROLLER SYSTEM

RELATED APPLICATIONS

The present application is a U.S. National Phase Application of International Application No. PCT/EP2010/067413 (filed 12 Nov. 2010) which claims priority to German Application No. 10 2009 047 049.2 (filed 24 Nov. 2009).

The present invention concerns a pilger rolling mill comprising a roll stand, a flywheel on a drive shaft which is mounted rotatably about an axis of rotation, and a thrust rod having a first end and a second end, wherein the first end of the thrust rod is fixed to the flywheel at a radial spacing from the axis of rotation and wherein the second end of the thrust rod is fixed to the roll stand so that in operation of the mill a rotary movement of the flywheel is converted into a translatory movement of the roll stand, comprising a drive motor having a motor shaft, wherein the motor shaft of the drive motor and the drive shaft are connected together in such a way that a rotary movement of the motor shaft leads to a rotary movement of the drive shaft and thus the drive motor drives the flywheel.

To produce precise metal tubes, in particular of steel, an expanded hollow-cylindrical blank is reduced by pressure stresses. In that case the blank is converted to the form of a tube of defined reduced outside diameter and defined wall thickness.

The most wide-spread reducing method for tubes is known as cold pilgering, the blank being referred to as the tube shell. In the rolling operation the tube shell in the completely cooled condition, is pushed over a rolling mandrel which is calibrated, that is to say which is of the inside diameter of the finished tube, and in that situation is embraced from the outside by two rolls which are calibrated, that is to say which define the outside diameter of the finished tube, and is rolled out in the longitudinal direction over the rolling mandrel.

During cold pilgering the tube shell experiences a stepwise feed in a direction towards the rolling mandrel or beyond same, while the rolls are horizontally reciprocated rotatably over the mandrel and thus the tube shell. In that case the horizontal movement of the rolls is predetermined by a roll stand to which the rolls are rotatably mounted. The rolls receive their rotary movement from a rack which is stationary relative to the roll stand and into which engage gears which are fixedly connected to the roll shafts. The feed of the tube shell over the mandrel is effected by means of a feed clamping saddle which permits a translatory movement in a direction parallel to the axis of the rolling mandrel. The linear feed of the feed clamping saddle in the known cold pilger rolling mills is achieved by means of a ball screw spindle drive. In that case the ball screw spindle drive comprises a servomotor, a transmission, a trapezoidal screw spindle, the associated mounting points and appropriate lubrication as well as a trapezoidal screw spindle nut. The servomotor is connected in a coupling to the transmission and by way of a further coupling to the trapezoidal screw spindle itself. The rotary movement of the screw spindle is converted into a translatory movement by means of the trapezoidal screw spindle nut. In that arrangement the trapezoidal screw spindle nut is connected to the feed clamping saddle so that upon a rotation of the spindle the spindle nut and therewith the feed clamping saddle is converted into a translatory movement towards the rolling mandrel. In addition to the spindle drive, to guide the feed clamping saddle, there are provided guide rails which predetermine the translatory direction of the feed clamping saddle.

The conically calibrated rolls arranged in mutually superposed relationship in the roll stand rotate in opposite relationship to the feed direction of the feed clamping saddle. The so-called pilger mouth formed by the rolls engages the tube shell and the rolls push a small wave of material away from the outside, the wave being stretched out by the smoothing caliber of the rolls and the rolling mandrel to afford the intended wall thickness until the clearance caliber of the rolls releases the finished tube. During the rolling operation the roll stand with the rolls mounted thereto moves in opposite relationship to the feed direction of the tube shell. After reaching the clearance caliber of the rolls the tube shell is fed by means of the feed clamping saddle by a further step towards the rolling mandrel while the rolls with the roll stand move back into their horizontal starting position. At the same time the tube shell experiences a rotation about its axis to achieve a uniform shape for the finished tube. Rolling over each tube portion a plurality of times provides a uniform wall thickness and roundness for the tube and uniform inside and outside diameters.

While as described above the linear feed of the feed clamping saddle in known cold pilger rolling mills is achieved by means of a ball screw spindle drive or alternatively also a linear drive the horizontal reciprocating movement of the roll stand is effected by means of a crank drive. In that case the crank drive comprises a transmission, a flywheel, a thrust rod and suitable lubrication, the crank drive being driven by an electric motor. The electric motor is connected by way of a coupling to the transmission and by way of a further coupling to the flywheel. At a first end the thrust rod is connected to the flywheel by means of a bearing in eccentric relationship with the axis of rotation. The second end of the thrust rod is also connected by means of a bearing to the roll stand so that the rotary movement of the flywheel is converted into a translatory movement of the roll stand. In that case the direction of translatory movement of the roll stand is predetermined by guide rails.

Both a precise and controlled stepwise feed of the feed clamping saddle and also a precise and controlled translatory movement of the roll stand are indispensable for producing precisely manufactured tubes. In particular conversion of a high torque into a linear force in the translatory direction is subject to high demands. In the state of the art therefore a drive train with a step-down ratio is selected for driving the crank drive. The step-down ratio prevents low translation speeds of the roll stand and in combination with the great play which is implied by the step-down transmission ratio means that accurate positioning of the roll stand is made more difficult. Such a slow and precise displacement of the roll stand however is absolutely necessary for cold pilgering of tubes of small nominal diameters as otherwise that results in irregularities in the production of those tubes of small diameters.

The friction occurring in the transmission leads to energy and power losses and to wear of the transmission itself so that at regular intervals the entire transmission or at least parts thereof have to be replaced. That replacement involves high mounting and spare part costs, while the stoppage times of the rolling mill also have to be taken into consideration as consequential costs.

Having that background in mind the object of the present invention is to provide a pilger rolling mill whose drive for the roll stand involves no or only very slight wear and which in addition permits precise displacement of the roll stand with a high degree of reproduction accuracy.

According to the invention that object is attained by a pilger rolling mill comprising a roll stand, a flywheel on a drive shaft which is mounted rotatably about an axis of rotation, and a thrust rod having a first end and a second end, wherein the first end of the thrust rod is fixed to the flywheel at a radial spacing from the axis of rotation and wherein the second end of the thrust rod is fixed to the roll stand so that in operation of the mill a rotary movement of the flywheel is converted into a translatory movement of the roll stand, comprising a drive motor having a motor shaft, wherein the motor shaft of the drive motor and the drive shaft are connected together in such a way that a rotary movement of the motor shaft leads to a rotary movement of the drive shaft and thus the drive motor drives the flywheel, wherein the drive motor is a torque motor.

Such a drive motor, in particular a torque or hollow-shaft motor, has the advantage that it directly drives the flywheel and renders the transmission in the state of the art redundant. Frictional losses and wear phenomena are reduced in that way. In addition the number of mechanical components is also markedly reduced, which inter alia reduces the costs involved with storage of spare parts. The stoppage time of the rolling mill, caused by possible repairs, is restricted. A torque motor produces a high level of torque at low speed and is of a compact structural volume. The torque motor used here can be both in the form of a synchronous or an asynchronous motor.

In an embodiment of the invention the pilger rolling mill is a cold pilger rolling mill.

If in an embodiment the motor and the drive shaft are in one piece, this has an advantageous effect on the drive of the roll stand as there are neither a coupling play nor additional components. The elimination of components such as for example gears reduces the need for lubrication, reduces wear and also closely linked thereto the maintenance complication and expenditure, as well as the costs for storage and servicing.

In a further embodiment the drive motor is a hollow-shaft motor, for example a torque motor in the sense of the present application, the rotor of which is hollow so that the rotor for example can be pushed directly on to the motor shaft and fixed there. The torque of the drive motor is thus transmitted directly to the motor shaft.

In a further embodiment the motor shaft and the drive shaft of the flywheel are connected together by way of a coupling, wherein the coupling preferably connects the two shafts together in force-locking relationship.

In a further embodiment the motor shaft of the drive motor and the drive shaft of the flywheel are connected together by way of a coupling in positively locking relationship. Positively locking couplings have the advantage that they can be separated easily and without involving the application of a great deal of force. In that case the movement of the two components relative to each other is greatly restricted by the interengagement of partial contours of the components to be connected, in particular teeth and claws. The effect of the positively locking engagement is dependent in particular on the geometry and the material properties of the interengaging partial contours. The transmission of force is along a preferential direction, while the positively locking connection is disengaged in opposite relationship to that preferential direction. The disadvantage of the maintenance complication and expenditure in that case is counterbalanced by the advantage involved in easy replacement of components and the low production costs of such couplings.

In an embodiment the motor shaft of the drive motor and the drive shaft of the flywheel are connected together by way of a coupling, the coupling being a bevel gear transmission. An advantage with this kind of embodiment is that the axis of rotation of the motor shaft of the motor and the axis of rotation of the drive shaft of the flywheel do not have to be parallel to each other. The position of the axes of rotation of the shaft of the drive motor and the shaft of the flywheel include an angle which however does not influence the rotary speed and also not the transmission ratio between the two shafts. It is particularly advantageous in that respect that the spatial arrangement of drive motor and flywheel is flexible and thus the space required by the drive for the roll stand can be matched to the aspects of the place of erection, while high reconstruction costs are avoided.

In an embodiment the motor shaft and the drive shaft each have a gear, wherein the gears mesh with each other in positively locking relationship so that rotation of the motor shaft leads to rotation of the drive shaft. It is advantageous in that respect that the drive motor already provides the high torque levels required and can be transmitted by way of the flywheels to shafts arranged for example in parallel.

In an embodiment the flywheel forms the gear of the drive shaft.

A further embodiment is of such a configuration that a full revolution of the motor shaft causes a full revolution of the drive shaft. In other words, no transmission step-up or step-down ratio is provided between the drive motor and the flywheel in an embodiment.

A further embodiment has a mounting for the motor shaft and/or the drive shaft of the flywheel so that movements in a direction perpendicularly to the shaft and/or in the longitudinal direction of the shaft are damped. In that respect the term damping in accordance with the present invention denotes complete or partial absorption or complete or partial transmission of forces which do not increase the efficiency of the drive.

If the drive motor has a rotor and a stator then in an embodiment it is advantageous if the stator has a mounting which receives the (counter-) torque exerted on the stator, the mounting having a damping element. By means of the damping action it is possible for example to reduce imbalances in the rotational movement and/or torque fluctuations so that the effect of forces and moments which decrease the efficiency of the drive motor is reduced. The drive motor can thus on the one hand be protected from increased wear while on the other hand the stator can transmit the torques to the rotor and thus to the motor shaft more precisely.

In an embodiment in particular imbalances and torque fluctuations in relation to the drive motor and/or the drive shaft and/or the motor shaft are compensated by the mounting elements. That can help to reduce the wear of the supported component and leads to savings in repair and maintenance costs.

Such a mounting element can have for example a portion, in the form of a projection, of the component to be damped, and two damping elements. In that case the damping elements can embrace the projection from two opposite sides so that movements, forces and moments which act in the line joining the two damping elements can be reduced. Any transverse forces or force components which possibly occur, transversely relative to the connecting line, can also be reduced depending on the respective configuration of the damping elements and the arrangement thereof with respect to the projection.

According to the invention in an embodiment it is advantageous if the drive motor has a housing, the stator being connected to the housing by way of the damping element.

For example it is advantageous in an embodiment if the drive motor has a housing, wherein the stator is connected to the housing and wherein the housing is connected by way of the damping element to a holding means, preferably a housing of the crank drive, so that torque fluctuations and/or imbalances are supported in relation to the holding means.

In an embodiment the damping element has an elastically deformable material portion. The damping properties of the damping element then depend on the material used and the configuration thereof and can be only limitedly influenced during operation. An example of such a passive damping element is a rubber buffer.

Active mounting elements as are used in a further embodiment have for example pneumatic or hydraulic damping elements. The action of such damping elements can be adapted to the respective operating situation for example by regulation and/or control during operation. Even high forces and torques can be compensated for example by the provision of a counterpressure or counterforce. With a suitable sensor system it is also conceivable for forces and torques adversely influencing the operating procedure to be detected and dynamically reduced with the active damping elements.

In an embodiment of the invention the individual movements of the feed clamping saddle (feed and rotation of the tube shell) and the forward and backward movement of the roll stand are implemented with drives which are initially independent of each other. In an embodiment therefore it is advantageous if the drive motor and in particular the drive motor for the roll stand and at least one further drive motor, in particular the drive motor for the feed clamping saddle, are connected together by way of electronic interfaces, wherein operation of the at least two drive motors, which is synchronised in accordance with the rolling process, is possible.

Further advantages, features and possible uses of the present invention are clearly apparent from the description hereinafter of preferred embodiments and the associated Figures.

Figure 4:
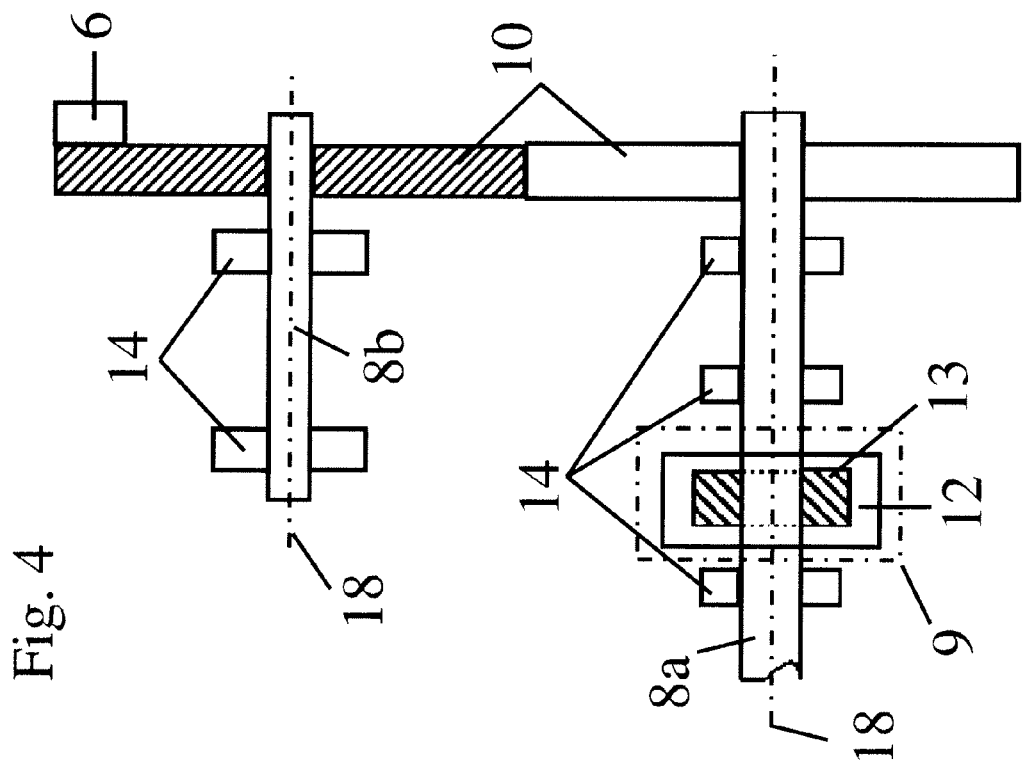

FIG. 1 shows a side view of the diagrammatic structure of a cold pilger rolling mill according to an embodiment of the present invention, FIG. 2 shows a sectional side view of a drive train of a roll stand of a cold pilger rolling mill according to an embodiment of the present invention, FIG. 3 shows a longitudinal section through the drive train in an alternative embodiment, FIG. 4 shows a longitudinal section through the drive train in a further embodiment, and FIG. 5 shows a group drawing of an arrangement according to the invention of a drive motor on a holder.

FIG. 1 diagrammatically shows the structure of a pilger rolling mill according to the invention as a side view. The rolling mill comprises a roll stand 1 having rolls 2, 3, a calibrated rolling mandrel 4 and a drive for the roll stand 1. The drive for the roll stand 1 has a thrust rod 6, a drive motor 9 and a flywheel 10. A first end of the thrust rod 6 is fixed on the flywheel 10 eccentrically relative to the axis of rotation of the drive shaft 8.

In the illustrated embodiment the axis of rotation 18 of the motor shaft 8a coincides with the axis of rotation of the drive shaft 8b of the flywheel 10.

When the rotor of the drive motor is rotating then a torque is produced, which is transmitted to the motor shaft 8a connected to the rotor. The motor shaft 8a is connected to the flywheel 10 of the drive train in such a way that the torque is transmitted to the flywheel 10. As a consequence of the torque the flywheel 10 rotates about its axis of rotation. The thrust rod 6 which is arranged at the first end 16 of the flywheel with a bearing at a radial spacing 7 experiences a tangential force and transmits same to the second end 17 of the thrust rod. The roll stand 1 connected to the second end 17 of the thrust rod is moved along the displacement direction established by the guide rail of the roll stand 1.

During cold pilgering on the rolling mill shown in FIG. 1 the tube shell 11 experiences a stepwise feed in a direction towards the rolling mandrel 4 or over same, while the rolls 2, 3 are horizontally reciprocated rotatingly over the mandrel 4 and thus over the tube shell 11. In that case the horizontal movement of the rolls 2, 3 is predetermined by a roll stand 1 to which the rolls 2, 3 are rotatably mounted. The roll stand 1 is reciprocated in a direction parallel to the rolling mandrel 4 while the rolls 2, 3 themselves receive their rotary movement from a rack which is stationary relative to the roll stand 1 and into which engage gears fixedly connected to the roll shafts. The feed of the tube shell 11 over the mandrel 4 is effected by means of the feed clamping saddle 5 which permits a translatory movement in a direction parallel to the axis of the rolling mandrel 4. The conically calibrated rolls 2, 3 arranged in mutually superposed relationship in the roll stand 1 rotate in opposite relationship to the feed direction of the feed clamping saddle 5. The so-called pilger mouth formed by the rolls engages the tube shell 11 and the rolls 2, 3 press a small wave of material away from the outside, the wave being stretched out by a smoothing caliber of the rolls 2, 3 and the rolling mandrel 4 to give an intended wall thickness until a clearance caliber of the rolls 2, 3 releases the finished tube. During the rolling procedure the roll stand 1 with the rolls 2, 3 mounted thereto moves in opposite relationship to the feed direction of the tube shell 11. After reaching the clearance caliber of the rolls 2, 3, the tube shell 11 is advanced by means of the feed clamping saddle 5 by a further step towards the rolling mandrel 4 while the rolls 2, 3 return with the roll stand 1 to their horizontal starting position. At the same time the tube shell 11 experiences a rotation about its axis to achieve a uniform shape for the finished tube. A uniform wall thickness and roundness for the tube and uniform inside and outside diameters are achieved by rolling over each tube portion a plurality of times.

A central procedural control system controls the initially independent drives of the rolling mill so that the above-described procedure in the rolling process is achieved. Control begins with triggering a feed step of the drive of the feed clamping saddle 5 for advancing the tube shell 11. After the feed position is reached the drive is actuated in such a way that it holds the feed clamping saddle 5 static. The rotary speed of the drive motor 9 for the roll stand 1 is so controlled that, simultaneously with the feed step of the feed clamping saddle 5, the roll stand 1 is moved back into its starting position while, after the conclusion of the feed step, the roll stand 1 is moved horizontally over the tube shell 11, in which case the rolls 2, 3 roll out the tube shell 11 afresh. When reaching the reversal point of the roll stand 1 the drive of the clamping chuck is actuated in such a way that the tube shell 11 is rotated about the mandrel 4.

The arrangement of the drive motor 9 and the flywheel 10, in which the motor shaft 8a of the drive motor and the drive shaft 8b of the flywheel 10 are in one piece can be clearly seen in the longitudinal sectional view of an embodiment in FIG. 2. The rotor 13 connected to the one-piece shaft 8 drives the flywheel 10 by way of the electromagnetic interactions with the stator 12 of the drive motor 9. In that respect in the embodiment it is advantageous that the influence of interference forces, that is to say forces which adversely influence the efficiency of the drive perpendicularly or in the longitudinal direction of the axis of rotation of the one-piece shaft 8, is reduced by mounting the one-piece shaft 8 with bearings 14. Damage to structural components by vibration is thereby very substantially avoided.

FIG. 3 shows an alternative embodiment of the drive train. In this case the rotor 13 of the drive motor 9 is connected to the motor shaft 8a. The stator 12 of the drive motor 9 interacts with the rotor 13 and thus drives the motor shaft 8a. The motor shaft 8a is connected to the drive shaft 8b of the flywheel 10 by way of a coupling 15 so that a rotation of the motor shaft 8a of the motor causes a rotation of the drive shaft 8b of the flywheel 10. The rotation of the drive shaft 8b of the flywheel 10 leads to a rotation of the flywheel 10 itself. In the embodiment the axis of rotation of the motor shaft 8a corresponds to the axis of rotation of the drive shaft 8b of the flywheel 10. FIG. 3 further shows that the motor shaft 8a and the drive shaft 8b of the flywheel 10 are at least partially protected from the effects of adverse interference forces perpendicularly to the axis of rotation of the shafts 8a, 8b and/or in the longitudinal direction of the axis of rotation of the shaft 8a, 8b, by way of separate bearings 14.

FIG. 4 shows a diagrammatic sectional view through the drive train of an embodiment of the present invention. It will be clear in that respect that the rotor 13 of the drive motor 9 is connected to the motor shaft 8a. The stator 12 of the drive motor 9 interacts with the rotor 13 and thus drives the motor shaft 8a. A first flywheel 10 is connected to the motor shaft 8a so that rotation of the motor shaft 8a of the motor causes rotation of the first flywheel 10. A second flywheel 10 is arranged on a drive shaft 8b with the axis of rotation 18, wherein the flywheels are in the form of gears and engage into each other in positively locking relationship so that a full revolution of the first flywheel 10 causes a full revolution of the second flywheel 10 about the second axis of rotation 18. In addition the thrust rod 6 is connected to the second flywheel 10 so that rotation of the second flywheel 10 results in a linear movement of the thrust rod 6. A mounting for the motor shaft 8a and the drive shaft 8b with the bearings 14 reduces the effects of adverse interference forces perpendicularly to the two axes of rotation 18 and/or in the longitudinal direction of the two axes of rotation 18.

FIG. 5 shows a group drawing of an arrangement according to the invention of a drive motor on a holding means, wherein the holding means here is the housing 22 of the crank drive. A drive motor 9 having a housing 23 is arranged on the motor shaft 8a. In this case the motor 9 is not supported separately but is held by the motor shaft. The motor shaft 8a extends through the housing 22 of the crank drive and permits both front-side and also rear-side use of the torque afforded by the motor shaft 8a.

To carry the torque acting on the stator the stator is connected to the housing 22 of the crank drive by way of the housing 23.

So that torque fluctuations and forces and moments exerted on the motor shaft 8a do not lead to destruction of the motor and in particular however its rotor and housing 23, the housing 23 of the drive motor 9 is mounted to the housing 22 of the crank drive with eight damping elements 19. Each mounting has a projection 20 and two damping elements 19 arranged on opposite sides of the projection. Torques and forces which act on the damping elements can be detected by a suitable sensor system. The here hydraulic damping elements 19 can be dynamically adapted to the requirements involved, with a regulating or control system.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

While the invention has been illustrated and described in detail in the drawings and the preceding description that illustration and description is only by way of example and is not deemed to be a limitation on the scope of protection as defined by the claims. The invention is not limited to the disclosed embodiments.

Modifications in the disclosed embodiments are apparent to the man skilled in the art from the drawings, the description and the accompanying claims. In the claims the word 'have' does not exclude other elements or steps and the indefinite article 'a' does not exclude a plurality. The mere fact that certain features are claimed in different claims does not exclude the combination thereof. References in the claims are not deemed to be a limitation on the scope of protection.

LIST OF REFERENCES 1 roll stand
2 roll
3 roll
4 calibrated rolling mandrel
5 feed clamping saddle
6 thrust rod
7 spacing dr
8 shaft
8a motor shaft
8b drive shaft
9 drive motor
10 flywheel
11 tube shell
12 stator
13 rotor
14 mounting
15 coupling
16 first end of the thrust rod
17 second end of the thrust rod
18 axis of rotation
19 damping element
20 attachment
21 auxiliary line
22 housing of the crank drive
23 housing of the drive motor

The invention claimed is:

1. A pilger rolling mill comprising:
a roll stand,
a flywheel on a drive shaft which is mounted rotatably about an axis of rotation,
a thrust rod having a first end and a second end, wherein the first end of the thrust rod is fixed to the flywheel at a radial spacing from the axis of rotation and wherein the second end of the thrust rod is fixed to the roll stand so that in operation of the mill a rotary movement of the flywheel is converted into a translatory movement of the roll stand, and
a drive motor having a motor shaft, wherein the motor shaft of the drive motor and the drive shaft are connected together in such a way that a rotary movement of the motor shaft leads to a rotary movement of the drive shaft and thus the drive motor drives the flywheel,
wherein the drive motor is a torque motor, and
wherein the motor shaft and the drive shaft are connected together in such a way that a full revolution of the motor shaft causes a full revolution of the drive shaft.

2. A pilger rolling mill as set forth in claim 1 wherein the motor shaft and the drive shaft are in one piece.

3. A pilger rolling mill as set forth in claim 1 wherein the drive motor is a hollow-shaft motor.

4. A pilger rolling mill as set forth in claim 1 wherein the motor shaft and the drive shaft are connected together by way of a coupling.

5. A pilger rolling mill as set forth in claim 4 wherein the coupling connects the two shafts together in force-locking relationship.

6. A pilger rolling mill as set forth in claim 4 wherein the coupling connects the two shafts together in positively locking relationship.

7. A pilger rolling mill as set forth in claim 4 wherein the motor shaft and the drive shaft are connected together by way of a bevel gear transmission.

8. A pilger rolling mill as set forth in claim 1 wherein the motor shaft has a first gear which engages in positively locking relationship into a second gear of the drive shaft so that a rotation of the motor shaft causes a rotation of the drive shaft.

9. A pilger rolling mill as set forth in claim 1 wherein the motor shaft and/or the drive shaft are so mounted that movements in a direction perpendicularly to the shaft and/or in the longitudinal direction of the shaft are damped.

10. A pilger rolling mill as set forth in claim 1 wherein the drive motor has a rotor and a stator, wherein the stator has a mounting which receives the torque exerted on the stator, and wherein the mounting has a damping element.

11. A pilger rolling mill as set forth in claim 10 wherein the drive motor has a housing, and wherein the stator is connected to the housing by way of the damping element.

12. A pilger rolling mill as set forth in claim 10 wherein the drive motor has a housing, wherein the stator is connected to the housing, and wherein the housing is connected by way of the damping element to a holding means.

13. A pilger rolling mill as set forth in claim 12 wherein the holding means includes a housing of the crank drive.

14. A pilger rolling mill as set forth in claim 10 wherein the damping element has an elastically deformable material portion.

15. A pilger rolling mill as set forth in claim 10 wherein the damping element is hydraulically or pneumatically damped.

* * * * *